Nov. 9, 1954 J. DEAN ET AL 2,694,192

MAGNETIC RECORDING APPARATUS

Filed Nov. 21, 1950 3 Sheets-Sheet 1

INVENTORS:
JAMES DEAN &
BRIAN WATSON POLLARD

ATTORNEYS:
Moore and Hall

INVENTORS:
JAMES DEAN &
BRIAN WATSON POLLARD
ATTORNEYS:
Moore and Hall

Nov. 9, 1954 J. DEAN ET AL 2,694,192

MAGNETIC RECORDING APPARATUS

Filed Nov. 21, 1950 3 Sheets-Sheet 3

INVENTORS:
JAMES DEAN &
BRIAN WATSON POLLARD

ATTORNEYS:
Moore and Hall

United States Patent Office 2,694,192

Patented Nov. 9, 1954

2,694,192

MAGNETIC RECORDING APPARATUS

James Dean, Sale, Cheshire, and Brian Watson Pollard, Hadfield, Derbyshire, England, assignors to National Research Development Corporation, London, England, a British corporation Application November 21, 1950, Serial No. 196,776

Claims priority, application Great Britain November 28, 1949

19 Claims. (Cl. 340—174)

This invention relates to improvements in magnetic recording apparatus by which electric signals can be stored in the form of predetermined magnetisation patterns in a magnetic recording medium forming a surface of a movable carrier such as a rotating wheel or drum.

Such a magnetic recording apparatus finds application in digital computing machines and in particular in electronic digital computing machines of the type which employ devices, such as cathode-ray-tubes, affording the facility of immediate access to any data stored therein, but having only a limited capacity for storing such digital data and which need to be provided with a large capacity store of so-called "permanent" character capable of recording all of the data required in the operation of the machine that is not needed to be available for immediate use. The invention is particularly, although by no means exclusively, concerned with the provision of a magnetic recording device which may be employed as the so-called permanent store of an electronic computing machine.

Such a magnetic recording system conveniently utilises a rotating drum or cylinder to store a large number of digits on a single drum assembly which is capable of being run in synchronism with external sources of digit signals so that digits may be recorded or written on to the recording medium of the drum and reproduced or read from such drum accurately in step with the external signals. An example of such operation is described in the specification of copending patent application No. 146,445, now Patent No. 2,652,554, issued September 15, 1953. The magnetisation patterns representing the digit signals will normally be arranged in a number of parallel tracks running circumferentially round the curved outer surface of the magnetic recording drum so that the above stated requirements of large storage capacity limits the length of recording track which may be allocated to each digit and defines the speed of rotation and the degree of synchronism of the recording drum necessary to ensure that any particular digit may be reproduced at the exact time instant it is required for reinsertion into the operative computing circuits of the machine.

In the operation of magnetic recording drum devices it is normal practice to drive the drum at a maximum conveniently high speed and obtain the necessary synchronous operation with external signals by the application of a controlled braking torque to the drum. The desire for simplicity in the driving motor and the need for avoidance of brushes restricts the practicable range of speed which can be obtained and in a particular example the synchronous speed may be of the order of 2080 R. P. M. At such a speed and with the recording and reproducing heads at present available as many as 160 digits may be stored per linear inch of track length and such a recording and reproducing head will require to be spaced from the recording surface by only a very small distance, possibly of the order of not more than 0.001 inch. It will be clear that the requirement for smooth running and lack of eccentricity of such a recording drum places considerable limitations on the mechanical design and in general, for a drum of given large diameter, attempts to increase the recording area by means of extending the axial length may result in failure to meet the mechanical requirements. Reduction of the diameter of such a drum coupled with a more than proportional increase of axial length in general enables the storage area to be increased and the mechanical requirements for accurate running to be made. A further requirement which restricts the permissible drum structure is the consideration of the maximum time which may be allowed for obtaining access to any stored digit.

As demonstrated above the storage capacity of the rotating recording drum, in general can only be increased by increasing its axial length which may thus exceed the diameter by a considerable amount. In a practical magnetic storage drum system the actual length of track allocated to each magnetisation pattern may be such that as many as 160 digits can be recorded per inch of track while the axial separation of adjacent circumferential record tracks may be of the order of 0.025 inch. A high degree of angular accuracy of positioning is thus required to be maintained throughout a considerable axial length, together with a considerable accuracy of longitudinal positioning of the drum. The mechanical rigidity of the drum assembly must accordingly be very great and there must be no torsional distortion set up in any of its constituent parts including the recording drum, its driving motor and the braking motor usually employed for the purpose of maintaining synchronism. The permissible tolerance of eccentricity is also very small, being of the order of 0.0001 inch or less as greater eccentricity will result in an intolerable variation in the amplitude of the recorded and/or reproduced signals.

In order to maintain the required degree of rotational synchronism with a series of external signals of highly stable frequency the inertia/friction ratio of the rotatable parts should be as high as possible. This implies that the moment of inertia of the rotatable parts about the axis of rotation should be as large as possible while the mass of the rotatable parts and thus the bearing friction should be kept as small as possible consistent with the provision of a suitably high moment of inertia.

The object of the present invention is to provide a magnetic recording drum assembly in which the axial length of the recording drum may be greater than the drum diameter while maintaining an adequate degree of mechanical rigidity and in which the inertia/friction ratio of the rotating parts is maintained at a desirable high value.

According to the broadest aspect of the present invention the recording apparatus comprises a hollow drum-like member carrying a recording medium on its outer peripheral surface and rotatable about a fixed central shaft passing axially therethrough by means of an electric motor housed within said drum-like member and having its rotor elements carried by the latter and its stator elements secured to said shaft. Preferably the drum-like member is in the form of a right cylinder with said recording medium disposed upon its curved outer surface. In the preferred form utilising a second electric motor as a variable braking device for maintaining synchronism, such second electric motor is also housed within the hollow interior of the drum and has its rotor elements carried by the latter and its stator elements secured to said shaft.

Each motor used within said drum-like member is conveniently carried within a re-entrant portion of an end frame secured to and forming a closure for one end of the drum-like member.

In order that the various features of the invention may be more readily understood one constructional embodiment thereof will now be described by way of example and with reference to the accompanying drawings in which:

Fig. 2 is a vertical cross-sectional elevational view of the drum assembly while

Figure 2:
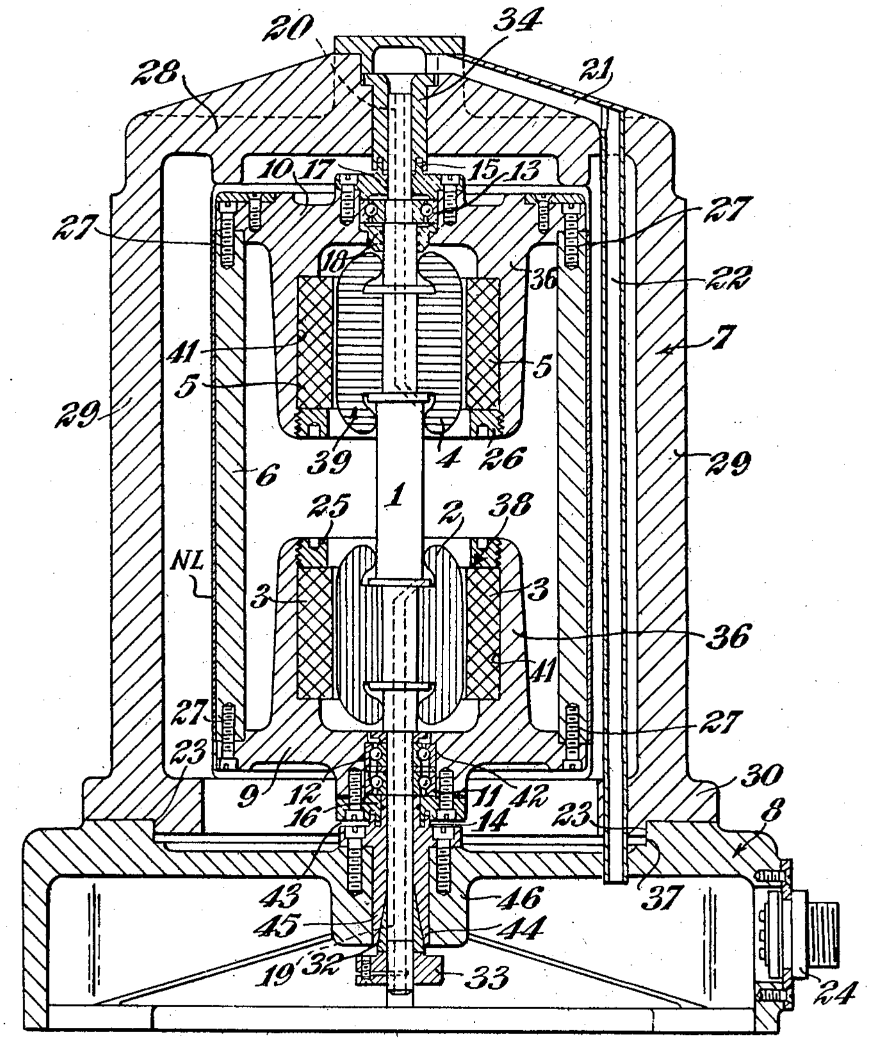
Figure 3:
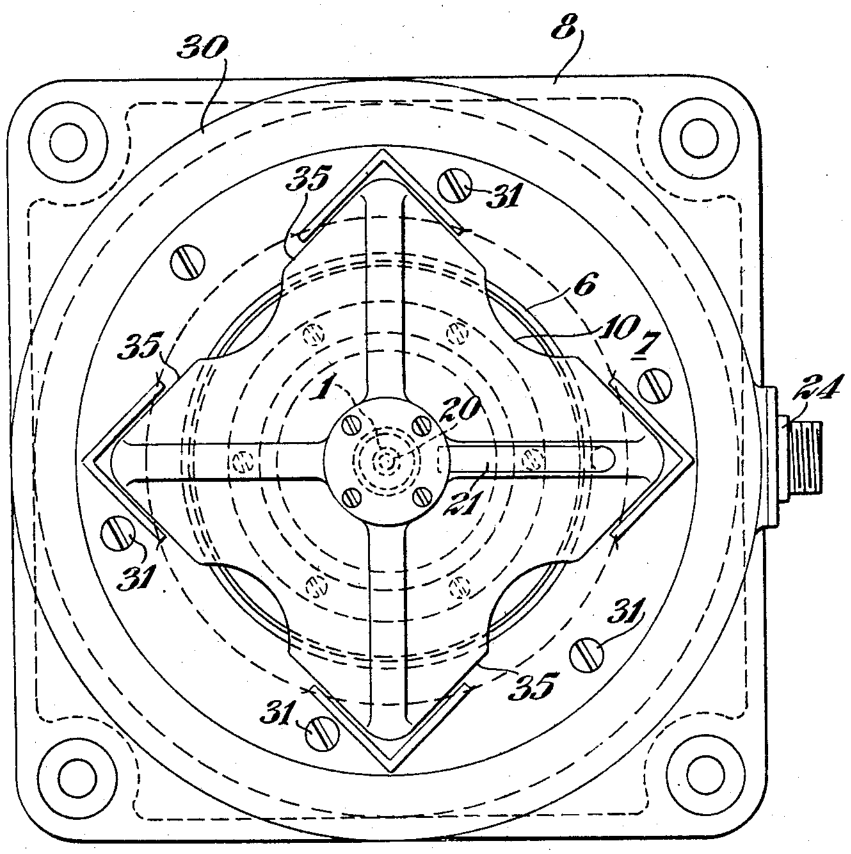
Fig. 3 shows a plan view of the device.

Referring more particularly to Figs. 2 and 3, the recording apparatus comprises a hollow cylinder or drum 6 which is closed at each end by end frames 9 and 10 and is rotatably mounted upon a fixed central shaft 1 which is supported in a vertical position by the seating of its upper end in the upper end plate 28 of an enclosing casing 7 which has four integral dependent columns 29 merging at their lower ends into a unitary flange 30 which is firmly and accurately secured to a massive base 8. The drum 6 is rotated by an electric motor 38 comprising a stator 2 and a rotor 3 while the necessary synchronism is maintained by means of a braking motor 39 constituted by stator 4 and rotor 5.

The drum 6 is of non-magnetic material and is preferably a tubular member formed of bronze centrifugally cast to avoid the occurrence of minor imperfections. This drum is then accurately machined and provided with an electro-plated layer of nickel NL around its curved outer surface for functioning as the recording medium.

The end frames 9 and 10 which close respectively the lower and upper ends of the drum 6, conveniently comprise machined castings of non-magnetic metal, e. g. bronze, and are fastened to the drum 6 by means of screws 27 so as to form, in conjunction with the drum, an integrated rotating structure of high inertia and relatively low mass and also of great mechanical strength. Each end frame 9 or 10 has a re-entrant cup-shaped portion 36 the interior of which is axially bored at 41 for receiving the rotor elements of the driving and braking motors 38, 39. Such rotor elements are conveniently secured in clamped relationship by the screw rings 25 and 26 respectively which serve to clamp such rotor elements firmly against a shoulder formed by the bottom of the related boring 41. It will be noted that by virtue of the use of a stationary centre shaft such rotor elements 3, 5 of the motors are constituted by the parts which normally form the stators. Similarly, the stator elements 2, 4 of the motors which are rigidly secured to the central shaft 1 are constituted by the parts which normally form the rotor elements of such motors.

The stator element 2 of the electric driving motor 38 conveniently comprises a three-phase winding wound on a laminated iron core while the rotor structure 3 of the same motor comprises an annular structure surrounding the stator core and provided with a squirrel cage winding. The stator 4 of the braking motor 39 comprises a simple single phase winding wound on a laminated iron core while the rotor assembly 5 includes an annular structure provided with a squirrel cage winding to allow the motor to act as an eddy-current brake. The single phase winding is energised from a suitable external source of braking current which is controlled to maintain synchronous rotation of the drum.

The rotatable drum structure, by arrangement as described, has high inertia and relatively low mass and is also of great mechanical strength. The disposition of the driving motor 38 and the eddy-current braking motor 39 to lie wholly within the drum structure permits their adequate protection and does not cause any avoidable increase in the axial length of the rotating system between its bearing points. Furthermore, the direct connection of the rotor element 3 of the driving motor 38 and the rotor element 5 of the braking motor 39 to the body of the hollow drum largely avoids all torsional distortion troubles which would necessarily occur if the drum were driven by a driving connection to a shaft therefor at a point beyond that of its bearing suspension.

The rotatable drum structure is supported upon the fixed central shaft 1 at its lower end by opposed thrust ball races 11 and 12 which are, externally, a tight fit within a bore 42 of the end frame 9 and are also internally a tight fit on the lower end of the central shaft 1. The thrust races 11, 12 are retained by an end cap 43 secured to the outer radial surface of an outwardly projecting central boss of the end frame 9 whereby such thrust races serve to position the rotating drum structure accurately in the axial direction. The upper end of the drum structure is rotatably supported on the central shaft 1 by means of a plain ball race 13 which is a neat fit on the shaft and permits any necessary slight axial movement to accommodate differences of degree of expansion of length of the drum relatively to the shaft.

The assembly is normally mounted with the shaft 1 in a truly vertical position, the lowermost end of the shaft being rigidly clamped to the massive base element 8 by means of a taper collet 32 entering a corresponding bore 44 in a bushing 45 bolted to the centre bearing boss 46 of the base. This collet 32 is held secured and adjusted by the nut 33 which is screwed upon the threaded lower end of the shaft 1 and can be locked by suitable means such as that of the clamping screw and slot shown.

The uppermost end of the shaft 1 is a neat push fit in a bushing 34 held in the top of the upper end plate 28 of the casing 7 so as to allow any required axial movement of the shaft relative to the casing to accommodate differences of expansion. Such method of securing the shaft enables the axial location of the rotating drum to be accurately determined solely by the lower bearing and to be initially adjusted by means of the lower shaft clamping arrangement.

The retention of lubricant in both lower and upper bearings is cared for by the provision of slots and recesses 14 and 15 respectively which each form a labyrinth type packing and by the provision of grease grooves 16, 17 and 18 as indicated.

The enclosing casing 7 comprising the upper end plate 28 and the four integral dependant columns 29 which merge at their lowermost ends into the unitary flange 30 is accurately positioned with respect to the massive base 8 by the provision of a projecting spigot 23 or equivalent locating means which enters into co-operative engagement with a mating recess 37 in the upper surface of the base 8. The casing 7 and base 8 are secured together by six bolts 31. The necessary connecting leads for the three-phase winding on the stator 2 of the driving motor 38 are conveyed to their connection with an external power source through the channel 19 which passes axially up the centre of the shaft 1 from its lower end while the similar leads carrying the control current to the stator 4 of the braking motor 39 pass through the similar channel 20 disposed axially in the upper end of the shaft 1 and then by way of guide tubes 21 and 22 into the base 8 for eventual connection along with the leads from the driving motor 38 to an outlet terminal plug 24.

Figure 1:
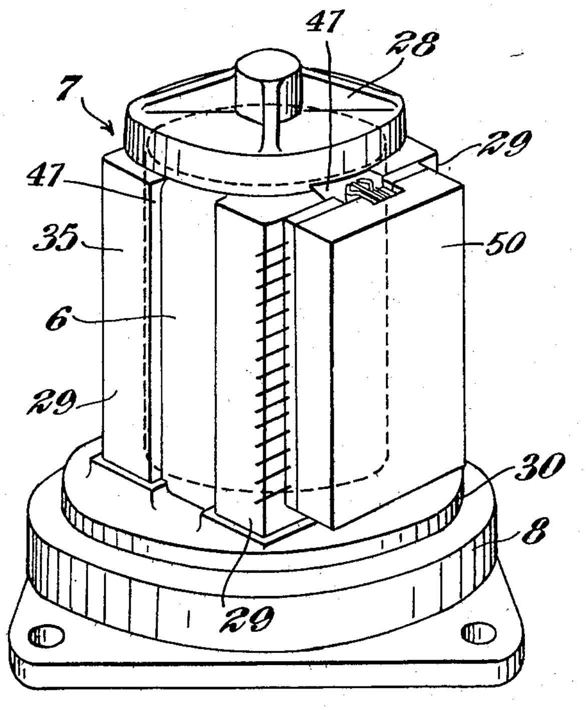
Fig. 1 is a perspective view of the complete recording apparatus showing a multiple recording and reproducing head secured thereto.

As shown more clearly in Fig. 1 the four dependent columns 29 of the casing 7 situated at 90° circumferential spacing positions, provide longitudinal apertures 47 therebetween through which magnetic recording and reproducing heads may be presented to the recording surface of the drum. For facilitating the accurate mounting of such recording and reproducing heads, one version of which is shown at 50 in Fig. 1, the flat faces or lands 35 left on the outer vertical surfaces of the columns 29 are actually machined with respect to the bushes in the base 8 and the casing 7 which locate the shaft 1 so that such lands are parallel, within very close limits, with the surface of the drum and accordingly provide an accurate location for the multiple track recording and reproducing heads. The latter are conveniently of the kind described in copending application Ser. No. 195,042, filed November 10, 1950, by F. C. Williams et al.

It will be clear that various constructional modifications and alterations of design may be made without departing from the invention. For example, the precise form of construction of the electric motor or motors may be varied within wide limits while the method of mounting the fixed central shaft may be altered and for some purposes such shaft may be arranged horizontally or at some other angle. Similarly, the outer casing may be of widely different form and may provide only one aperture therein for access to the magnetic recording surface of the drum.

We claim:

1. Apparatus for the magnetic recording of number-representing electric signals in an electronic digital computing machine which comprises a hollow drum-like member carrying a magnetic recording medium upon its outer peripheral surface and rotatable about a fixed central shaft passing axially therethrough by means of an electric driving motor housed within said drum-like member and having its rotor elements carried by said drum-like member and its stator elements secured to said shaft, and a second electric motor arranged for operation as a variable braking device also housed within the hollow interior of said drum-like member and having its rotor elements carried by said drum-like member and its stator elements secured to said shaft.

2. Apparatus for the magnetic recording of electric signals as claimed in claim 1 wherein said electric driving motor comprises a device of the squirrel cage type, the requisite energising windings being associated with a cylindrical laminated iron core secured to said shaft and the squirrel cage conductors being associated with an annular structure surrounding said iron core and secured to said drum-like member.

3. Apparatus for the magnetic recording of electric signals as claimed in claim 2 wherein said electric braking motor comprises an energising winding associated with a cylindrical laminated iron core secured to said shaft and a squirrel-cage conductor assembly associated with an annular structure surrounding said iron core and secured to said drum-like member.

4. Apparatus for the magnetic recording of electric signals as claimed in claim 3 wherein said rotor elements of each motor are carried upon an end frame secured to and serving to close an end of the hollow drum-like member.

5. Apparatus for the magnetic recording of electric signals as claimed in claim 4 in which said rotor elements are within a re-entrant portion of said end-frame.

6. Apparatus for the magnetic recording of number-representing electric signals in an electronic digital computing machine which comprises a hollow drum-like member carrying a magnetic recording medium upon its outer peripheral surface and rotatable about a fixed central shaft passing axially therethrough by means of an electric motor housed within said drum-like member and having its rotor elements carried by said drum-like member and its stator elements secured to said shaft, an enclosing casing surrounding said drum, said casing comprising an upper end plate, a lower base plate and a plurality of integral dependent columns on said upper end plate which merge at their lower ends into a unitary flange having a projecting spigot or equivalent locating means which enter into co-operative engagement with a mating surface on said lower base plate, the lower end of said fixed central shaft being carried by and secured to said base plate by means which permit adjustment of its longitudinal position thereon.

7. Apparatus for the magnetic recording of electric signals as claimed in claim 6 in which means are provided for allowing relative axial movement of said fixed central shaft with respect to the upper end plate of said casing to accommodate differences in expansion between the parts.

8. A magnetic recording device comprising a fixed shaft, a hollow drum of non-magnetic material rotatably mounted on said shaft, a layer of magnetic recording material around the outer curved peripheral surface of said drum, a plurality of separate recording and reproducing heads mounted in axially spaced and stationary positions adjacent said outer surface of said drum, an electric driving motor for rotating said drum, said motor being disposed wholly within said drum and comprising a rotor secured to said drum and a stator secured to said shaft and electro-magnetic braking means for said drum, said braking means being also disposed wholly within said drum and comprising a rotor secured to said drum and a stator secured to said shaft.

9. A magnetic recording device comprising a vertical fixed shaft, a hollow circular section cylinder of non-magnetic material rotatably mounted on said shaft, a layer of magnetic recording material around the outer curved peripheral surface of said cylinder, a plurality of separate recording and reproducing heads mounted in axially spaced and stationary positions adjacent said outer surface of said cylinder, an electric driving motor for rotating said cylinder, said motor being disposed wholly within said cylinder and comprising a rotor secured to said cylinder and a stator secured to said shaft and electro-magnetic braking means for said cylinder, said braking means being also disposed wholly within said cylinder and comprising a rotor secured to said cylinder and a stator secured to said shaft.

10. A magnetic recording device comprising a stationary base plate, a vertical fixed shaft secured in said base plate, a hollow drum of non-magnetic metal rotatably mounted on said shaft, an electro-deposited layer of magnetic recording material upon the outer curved peripheral surface of said drum, an upstanding support pillar on said base plate and outside said drum, a plurality of separate recording and reproducing heads mounted on said support pillar in axially spaced positions adjacent said layer on said drum, an electric driving motor for rotating said drum, said motor being disposed wholly within said drum and comprising a rotor secured to said drum and a stator secured to said shaft and electro-magnetic braking means for said drum, said braking means being also disposed wholly within said drum and comprising a rotor secured to said drum and a stator secured to said shaft.

11. A magnetic recording device comprising a stationary framework including a base plate, an end cap above said base plate and interconnecting support-pillars between said base plate and said end cap, a vertical fixed shaft held at one end in said base plate and at the other end in said end cap, a hollow drum of non-magnetic material rotatably mounted on said shaft within said framework, a layer of magnetic recording material around the outer curved peripheral surface of said drum, a plurality of separate recording and reproducing heads mounted on at least one of said support pillars in axially spaced positions adjacent said recording material layer on said drum, an electric driving motor for rotating said drum, said motor being disposed wholly within said drum and comprising a rotor secured to said drum and a stator secured to said shaft and electro-magnetic braking means for said drum, said braking means being also disposed wholly within said drum and comprising a rotor secured to said drum and a stator secured to said shaft.

12. A magnetic recording device comprising a hollow circular section cylinder of non-magnetic material, a layer of magnetic recording material on the outer peripheral surface of said cylinder, said recording material defining a plurality of axially spaced circumferential recording tracks around said cylinder, a plurality of magnetic recording heads mounted in axially spaced positions adjacent said recording material layer, one for each of said tracks, a stationary central shaft passing axially through said cylinder, end closure members, one for each end of said cylinder, said closure members having bearing means for rotatable mounting on said fixed central shaft, an electric driving motor disposed within said cylinder, said driving motor comprising a rotor secured to one of said end closure members and a stator secured to said shaft and electro-magnetic braking means disposed wholly within said cylinder, said braking means comprising a rotor secured to the other of said end closure members and a stator secured to said shaft.

13. A magnetic recording device comprising a hollow circular section cylinder of non-magnetic metal, an electro-deposited layer of magnetic recording material on the outer peripheral surface of said cylinder, said recording material layer defining a plurality of axially spaced circumferential recording tracks around said cylinder, a plurality of stationary magnetic recording and reproducing heads mounted in axially spaced positions adjacent said recording material layer, one for each of said tracks, a stationary central shaft passing axially through said cylinder, end closure members, one for each end of said cylinder, said closure members having anti-friction bearing means for rotatable mounting on said fixed central shaft, an electric driving motor disposed within said cylinder, said driving motor comprisin a rotor secured to one of said end closure members and a stator secured to said shaft and electro-magnetic braking means disposed wholly within said cylinder, said braking means comprising a rotor secured to the other of said end closure members and a stator secured to said shaft.

14. A magnetic recording device comprising a hollow circular section cylinder of centrifugally cast non-magnetic metal, an electro-deposited layer of nickel on the outer peripheral surface of said cylinder, said nickel layer constituting a magnetic recording surface defining a plurality of circumferential recording tracks around said cylinder, a plurality of stationary magnetic recording heads mounted in axially spaced positions adjacent said nickel recording layer, one for each of said tracks, a stationary central shaft passing axially through said cylinder, end closure members secured one to each end of said cylinder, said closure members having ball-bearing means for rotatable mounting on said fixed central shaft, a squirrel-cage type electric driving motor disposed within said cylinder, said driving motor comprising a rotor including the squirrel cage conductors secured to one of said end closure members and a stator including the requisite energising windings secured to said shaft and electro-magnetic braking means disposed wholly within said cylinder, said braking means comprising a rotor secured to the other of said end closure members and a stator secured to said shaft.

15. A magnetic recording device comprising a hollow circular section cylinder of centrifugally cast bronze, an electro-deposited layer of pure nickel on the outer peripheral surface of said cylinder, said nickel layer constituting a magnetic recording surface defining a plurality of axially spaced circumferential recording tracks around said cylinder, a plurality of stationary magnetic recording heads mounted in axially spaced positions adjacent said nickel recording material layer, one for each of said tracks, a stationary vertical central shaft passing axially through said cylinder, end closure members secured one to each end of said cylinder, said closure members having bearing means for rotatable mounting on said fixed central shaft, a squirrel cage type electric driving motor disposed within said cylinder, said driving motor comprising a rotor including the squirrel cage conductors secured to one of said end closure members and a stator including energising windings secured to said shaft and electro-magnetic braking means disposed wholly within said cylinder, said braking means resembling a squirrel-cage type motor and comprising a rotor including the squirrel-cage conductors secured to the other of said end closure members and a stator including an energising winding secured to said shaft.

16. A magnetic recording device comprising a hollow circular section cylinder of non-magnetic metal, an electro-deposited layer of nickel upon the outer peripheral surface of said cylinder, said nickel layer constituting a magnetic recording medium defining a plurality of separate circumferential recording tracks around said cylinder, a stationary mounting member, a fixed shaft secured in said stationary mounting member and passing axially through said cylinder, a plurality of separate recording heads mounted on said mounting member in axially spaced relationship relative to said cylinder to provide a separate recording head adjacent each of said circumferential recording tracks, an electric motor for rotating said drum, said motor being disposed wholly within said drum and comprising a rotor secured to said drum and a stator rigid with said shaft and electro-magnetic braking means for said drum, said braking means being also disposed wholly within said cylinder and comprising a rotor secured to said drum and a stator secured to said shaft.

17. A magnetic recording device for storage of binary number-representing signals in an electronic digital computing machine which comprises a hollow circular section cylinder of non-magnetic metal, an electro-deposited layer of magnetic recording material on the outer peripheral surface of said cylinder, said layer defining a plurality of separate circumferential recording tracks around said cylinder, a stationary shaft passing axially through said cylinder, a base plate at one end of said cylinder, said base plate receiving said shaft in rotationally fixed relationship therein, a cap member at the opposite end of said cylinder, said cap member receiving said shaft in rotationally fixed relationship therein, a plurality of pillars disposed outside said drum and extending from said base plate to said cap member, means rigidly securing said cap member to said pillars, a plurality of separate recording and reproducing heads secured to at least one of said pillars, said heads being disposed adjacent said recording layer in axially separated positions one for each of said tracks, an electric motor for rotating said drum, said electric motor comprising a rotor disposed within said drum and secured thereto and a stator also disposed within said drum and rigidly connected to said shaft and electro-magnetic braking means for said drum, said braking means comprising a rotor disposed within said drum and secured thereto and a stator also disposed within said drum and rigidly secured to said shaft.

18. A magnetic recording device for storage of binary number-representing signals in an electronic digital computing machine which comprises a hollow circular section cylinder of non-magnetic metal, an electro-deposited layer of pure nickel on the outer peripheral surface of said cylinder, said nickel layer defining a plurality of separate circumferential magnetic recording tracks around said cylinder, a stationary shaft passing axially through said cylinder, a base plate at one end of said cylinder, said base plate receiving said shaft in rotationally fixed but axially adjustable relationship therein, a cap member at the opposite end of said cylinder, said cap member receiving said shaft in rotationally fixed but axially slidable relationship therein, a plurality of pillars integral with said base plate and disposed outside said drum and extending from said base plate to said cap member, means rigidly securing said cap member to said pillars, a plurality of separate recording and reproducing heads secured to at least one of said pillars, said heads being disposed adjacent said nickel layer in axially separated positions one for each of said recording tracks, an electric motor for rotating said drum, said electric motor comprising a rotor disposed within said drum and secured thereto and a stator also disposed within said drum and rigidly connected to said shaft and electro-magnetic braking means for said drum, said braking means comprising a rotor disposed within said drum and secured thereto and a stator also disposed within said drum and rigidly secured to said shaft.

19. A magnetic recording device for storage of binary number-representing signals in an electronic digital computing machine which comprises a hollow circular section cylinder of non-magnetic metal, an electro-deposited layer of pure nickel around the outer peripheral surface of said cylinder, said layer defining a plurality of separate endless circumferential recording tracks around said cylinder, a stationary vertical shaft passing axially through said cylinder, a base plate at the lower end of said cylinder, said base plate receiving the lower end of said shaft in rotationally fixed but axially adjustable relationship therein, a top cap member at the upper end of said cylinder, said cap member receiving the upper end of said shaft in non-rotational but axially slidable relationship therein, a plurality of vertical pillars integral with said base plate and disposed outside said drum and extending from said base plate to said cap member, means rigidly securing said cap member to said pillars, a plurality of separate recording and reproducing heads secured to at least one of said pillars, said heads being disposed adjacent said recording layer in axially separated positions one for each of said tracks, end closure members for each end of said cylinder, said closure members each having bearing means for rotatable mounting on said shaft and each having re-entrant cup-shaped portions within said cylinder, an electric motor for rotating said drum, said electric motor comprising a rotor disposed within said drum and secured to the re-entrant portion of one of said end closure members and a stator rigidly connected to said shaft and electro-magnetic braking means for said drum, said braking means comprising a rotor disposed within said drum and secured to the re-entrant portion of the other of said end closure members and a stator rigidly secured to said shaft.

References Cited in the file of this patent

UNITED STATES PATENTS

| Number | Name | Date |
|---|---|---|
| 765,078 | Jigouzo | July 12, 1904 |
| 1,058,545 | Caldwell | Apr. 8, 1913 |
| 1,504,609 | Crane | Aug. 12, 1924 |
| 1,980,056 | Hedeby | Nov. 6, 1934 |
| 2,430,843 | Colwell | Nov. 11, 1947 |
| 2,474,210 | Abbott | June 28, 1949 |
| 2,540,654 | Cohen et al. | Feb. 6, 1951 |